United States Patent
Donohue et al.

(10) Patent No.: US 7,031,335 B1
(45) Date of Patent: *Apr. 18, 2006

(54) DIGITAL NODE FOR HYBRID FIBER/COAX NETWORK

(75) Inventors: John E. Donohue, Ridgefield, CT (US); Aravanan Gurusami, Wallingford, CT (US); Clarke V. Greene, Middletown, CT (US)

(73) Assignee: ADC Telecommunications, Inc., Minnetonka, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/432,558

(22) Filed: Nov. 3, 1999

(51) Int. Cl.
  *H04L 12/413* (2006.01)
(52) U.S. Cl. .................... 370/445; 370/481
(58) Field of Classification Search ............ 714/746; 348/476, 14.01; 370/480, 328, 438, 315, 370/442; 359/167; 340/310.06; 333/103
See application file for complete search history.

(56) References Cited

U.S. PATENT DOCUMENTS

| | | | |
|---|---|---|---|
| 3,931,473 A | 1/1976 | Ferris, Jr. | |
| 3,995,144 A | 11/1976 | Johnson et al. | |
| 4,112,488 A | 9/1978 | Smith, III | |
| 4,244,046 A | 1/1981 | Brouard et al. | |
| 4,354,167 A * | 10/1982 | Terreault et al. | 333/103 |
| 4,402,076 A | 8/1983 | Krajewski | |
| 4,531,239 A | 7/1985 | Usui | |
| 4,754,451 A | 6/1988 | Eng et al. | |
| 4,816,825 A * | 3/1989 | Chan et al. | 340/825.5 |
| 4,920,533 A | 4/1990 | Dufresne et al. | |
| 4,959,829 A * | 9/1990 | Griesing | 370/315 |
| 5,136,410 A | 8/1992 | Heiling et al. | |
| 5,138,440 A | 8/1992 | Radice | |
| 5,198,989 A | 3/1993 | Petroff | |
| 5,272,700 A * | 12/1993 | Hansen et al. | 370/480 |

(Continued)

FOREIGN PATENT DOCUMENTS

EP  0 664 621  7/1994

(Continued)

OTHER PUBLICATIONS

"Broadband Medium Attachment Unit and Broadband Medium Specification, Type 10BROAD36" *ANS/IEEE Std. 802.3,* 177-205, (1996).

(Continued)

*Primary Examiner*—Huy D. Vu
*Assistant Examiner*—Daniel Ryman
(74) *Attorney, Agent, or Firm*—Fogg and Associates LLC; David N. Fogg

(57) ABSTRACT

An optical distribution node is provided. The optical distribution node includes a laser transceiver that is coupleable to at least one fiber optic link. The optical distribution node communicates upstream and downstream digital data with the head end over the at least one fiber optic link. The optical distribution node further includes a data concentrator coupled to the laser transceiver. Further, for each of at least one coaxial cable link, the optical distribution node includes a frequency translator and a node modem. The frequency translator receives and translates the upstream digital data from modems on the at least one coaxial cable link to a different carrier to provide a signal to the modems on the at least one coaxial cable link for collision detection. The node modem is coupled between the coaxial cable link and the data concentrator. The node modem demodulates upstream digital data for the data concentrator and modulates downstream digital data for transmission over the coaxial cable link.

46 Claims, 3 Drawing Sheets

U.S. PATENT DOCUMENTS

| | | | |
|---|---|---|---|
| 5,341,216 A | | 8/1994 | Hoffart |
| 5,442,700 A | * | 8/1995 | Snell et al. ............. 359/167 |
| 5,469,495 A | * | 11/1995 | Beveridge ............... 333/103 |
| 5,469,545 A | | 11/1995 | Vanbuskirk et al. |
| 5,557,319 A | | 9/1996 | Gurusami et al. ............ 348/11 |
| 5,586,121 A | * | 12/1996 | Moura et al. ............. 370/404 |
| 5,587,734 A | | 12/1996 | Lauder et al. |
| 5,621,786 A | | 4/1997 | Fischer et al. |
| 5,630,204 A | * | 5/1997 | Hylton et al. ............. 370/328 |
| 5,631,757 A | | 5/1997 | Bodeep et al. |
| 5,680,130 A | | 10/1997 | Tsutsui et al. |
| 5,729,370 A | | 3/1998 | Bernstein et al. |
| 5,754,552 A | * | 5/1998 | Allmond et al. ........... 370/465 |
| 5,765,097 A | | 6/1998 | Dail |
| 5,765,099 A | | 6/1998 | Georges et al. |
| 5,768,682 A | * | 6/1998 | Peyrovian ............... 348/14.01 |
| 5,774,789 A | | 6/1998 | Van der Kaay et al. |
| 5,777,544 A | | 7/1998 | Vander Mey et al. |
| 5,790,806 A | | 8/1998 | Koperda |
| 5,828,677 A | | 10/1998 | Sayeed et al. |
| 5,838,989 A | | 11/1998 | Hutchison et al. |
| 5,859,895 A | * | 1/1999 | Pomp et al. ........... 340/310.06 |
| 5,864,672 A | | 1/1999 | Bodeep et al. |
| 5,864,748 A | * | 1/1999 | Dail ........................... 725/126 |
| 5,867,485 A | | 2/1999 | Chambers et al. |
| 5,872,810 A | | 2/1999 | Philips et al. |
| 5,878,325 A | | 3/1999 | Dail |
| 5,930,262 A | * | 7/1999 | Sierens et al. ............. 370/442 |
| 5,946,622 A | | 8/1999 | Bojeryd |
| 5,963,844 A | | 10/1999 | Dail ........................... 455/5.1 |
| 5,986,691 A | * | 11/1999 | Henderson ................ 348/476 |
| 5,987,061 A | | 11/1999 | Chen |
| 6,112,086 A | * | 8/2000 | Wala .......................... 370/438 |
| 6,148,006 A | * | 11/2000 | Dyke et al. ................. 370/480 |
| 6,163,537 A | | 12/2000 | Thacker |
| 6,181,687 B1 | * | 1/2001 | Bisdikian ................... 370/347 |
| 6,282,683 B1 | * | 8/2001 | Dapper et al. ............. 714/746 |
| 6,356,369 B1 | | 3/2002 | Farhan |
| 6,377,782 B1 | | 4/2002 | Bishop et al. |
| 6,480,748 B1 | * | 11/2002 | Gerszberg et al. ............ 700/21 |
| 6,490,727 B1 | | 12/2002 | Nazarathy et al. |

FOREIGN PATENT DOCUMENTS

| | | |
|---|---|---|
| EP | 0 727 883 | 8/1996 |
| WO | WO 96/24989 | 8/1996 |

OTHER PUBLICATIONS

"Scienfific-Atlanta Announces New Technology To Enable High-Capacity Digital Reverse Path For Interactive Service", http://www.sciatl.com, *Scientific-Atlanta, Inc., Norcross, GA,* 1-2, (Jan. 18, 1999).

Sniezko, O., "Reverse Path for Advanced Series—Architecture and Technology", *NCTA Technical Papers,* AT&T Broadband & Internet Services, 11-19, (1999).

Sniezko, O., et al., "HFC Architecture in the Making", *NCTA Technical Papers,* AT&T Broadband & Internet Services, 20-29, (1999).

Akos et al., Jul. 1999, *IEEE Transactions on Communications,* 47:983-988, "Direct Bandpass Sampling of Multiple Distinct RF Signals".

Nakatsugawa et al., 2000, *IEEE,* pp. 617-621, "Software Radio Base and Personal Stations for Cellular/PCS Systems".

1998, Foxcom Wireless Proprietary Information, pp. 1-8, "Litenna In-Building RF Distribution System".

1998, Foxcom Wireless Proprietary Information, pp. 3-11, "Application Note Rfiber-RF Fiberoptic Links for Wireless Applications".

"Creating a Network for Interactivity", IEEE Spectrum, IEEE Inc., New York, US, vol.32, No. 4, Apr. 1995, pp 58-63, XP000506858, ISSN: 0018-9235.

"Adaptive Digital Access Protocol: A MAC Protocol for Multiservice Broadband Access Networks," Dail et al, IEEE Communications Magazine, 34(3), 104-112, Mar. 1, 1996.

* cited by examiner

DIGITAL NODE FOR HYBRID FIBER/COAX NETWORK

CROSS REFERENCE TO RELATED APPLICATIONS

This application is related to the following commonly assigned, co-pending applications:

U.S. application Ser. No. 09/273,197, entitled "DIGITAL RETURN PATH FOR HYBRID FIBER/COAX NETWORK" and filed on Mar. 19, 1999 and U.S. application Ser. No. 09/433,332, filed on the same date as the present application and entitled "DIGITAL NODE FOR HYBRID FIBER/COAX NETWORK".

TECHNICAL FIELD OF THE INVENTION

The present invention relates generally to the field of telecommunications and, in particular, to a digital node for a hybrid fiber/coax network.

BACKGROUND

Cable networks originally carried programming from a head end to subscribers over a network of coaxial cable. Over time, these networks have changed. Some cable networks now include fiber optic links as part of the network. This variety of cable network is colloquially referred to as a "hybrid fiber/coax" (HFC) network.

A hybrid fiber/coax network typically includes a head end that broadcasts programming over the network to subscribers in a downstream direction. The network includes two main portions. The first portion of the network is optical links that connect the head end with a number of geographically dispersed distribution nodes. These nodes are referred to as "optical distribution nodes" or "ODNs." At the ODNs, signals from the head end that carry the programming are converted from optical signals to electrical signals. The second portion of the network is coaxial links that connect the ODNs with subscriber equipment. The electrical signals are transmitted to the subscriber equipment over the coaxial cable links.

In recent years, the cable industry has experimented with systems that allow for bi-directional communication between subscriber equipment and the head end. This allows for services such as video-on-demand, telephony and Internet traffic to be offered over a cable network. Typically the 5 to 42 MHZ frequency range is reserved for upstream transmission from customers to the head end. Frequencies between 50 MHZ and an upper limit, e.g., 750 MHZ or 850 MHZ, typically carry downstream transmissions.

The design of the reverse path for transporting data over a hybrid fiber/coax network is laced with difficult technical issues. First, many customers must communicate over a common coaxial cable. Interference between customers and noise ingress onto the cable can cause disruptions and errors in this communication. Ingress and other interference is especially a problem at the low frequencies typically prescribed for upstream communications. Transporting simultaneous data transmissions from many customers also introduces complexity into the system design.

In most current systems, the reverse path is implemented with one of a number of different analog modulation schemes, e.g., MCNS, Data Over Cable Service Interface Specification (DOCSIS). These schemes are complicated to implement due to strict timing requirements and complex modulation schemes. Other systems, such as AT&T's mini fiber node (mFNs), introduce other complexities into the return path.

For the reasons stated above, and for other reasons stated below which will become apparent to those skilled in the art upon reading and understanding the present specification, there is a need in the art for an improved digital data path for a hybrid fiber/coax network.

SUMMARY

The above mentioned problems with telecommunications systems and other problems are addressed by the present invention and will be understood by reading and studying the following specification. A hybrid fiber/coax network is described which includes an optical distribution node that combines CSMA/CD error detection through frequency translation ("frequency turn-around") with modem functionality and data concentration.

In one embodiment, an optical distribution node is provided. The optical distribution node includes a laser transceiver that is coupleable to at least one fiber optic link. The optical distribution node communicates upstream and downstream digital data with the head end over the at least one fiber optic link. The optical distribution node further includes a data concentrator coupled to the laser transceiver. Further, for the at least one coaxial cable link, the optical distribution node includes a node modem. The node modem is coupled between the coaxial cable link and the data concentrator. The node modem demodulates upstream digital data for the data concentrator and modulates downstream digital data for transmission over the coaxial cable link. In another embodiment, the optical distribution node also includes a frequency translator coupled to the at least one coaxial cable link. The frequency translator receives and translates the upstream digital data from modems on the at least one coaxial cable link to a different carrier to provide a signal to the modems on the at least one coaxial cable link for collision detection.

DETAILED DESCRIPTION

The following detailed description refers to the accompanying drawings which form a part of the specification. The drawings show, and the detailed description describes, by way of illustration specific illustrative embodiments in which the invention may be practiced. These embodiments are described in sufficient detail to enable those skilled in the art to practice the invention. Other embodiments may be used and logical, mechanical and electrical changes may be made without departing from the scope of the present invention. The following detailed description is, therefore, not to be taken in a limiting sense.

I. EMBODIMENT OF A HYBRID FIBER/COAX NETWORK

Figure 1:
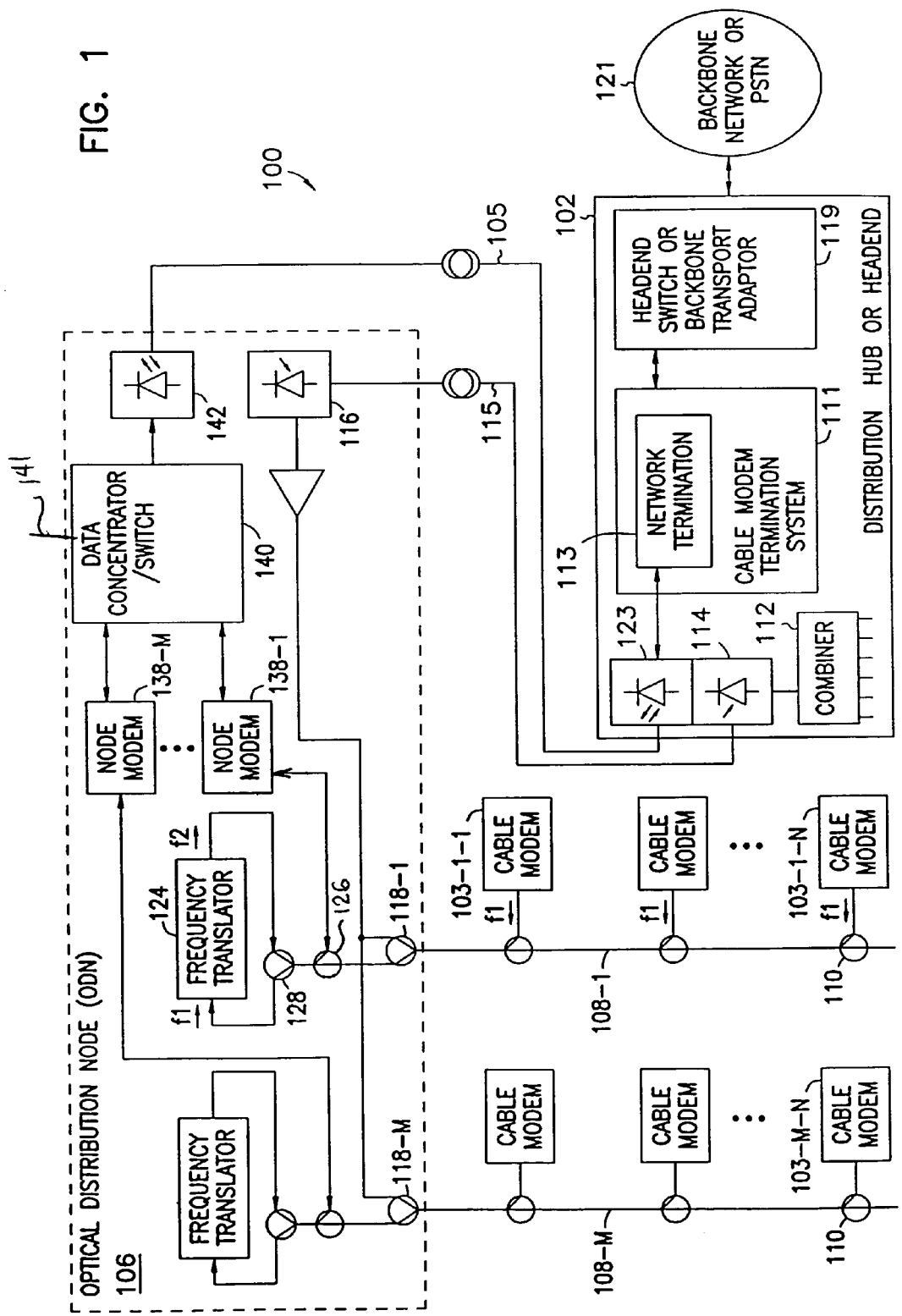
FIG. 1 is a block diagram of an embodiment of a hybrid fiber/coax network constructed according to the teachings of the present invention.

FIG. 1 is a block diagram of an embodiment of a hybrid fiber/coax (HFC) network, indicated generally at 100, and constructed according to the teachings of the present invention. Network 100 is a bi-directional network that carries signals between head end or hub 102 and a number of modems 103-1-1, . . . , 103-M-N. Advantageously, network 100 includes a bi-directional data path that carries data in digital format, e.g., as Ethernet or other packets of digital data using Internet Protocol (IP), between modems 103-1-1, . . . , 103-M-N and head end 102.

Head end 102 is coupled to modems 103-1-1, . . . , 103-M-N over a combination of fiber optics and coaxial cable. Namely, head end 102 is coupled via fiber optic link 105 with optical distribution node 106. Fiber optic link 105 is used to carry digital data between head end 102 and modems 103-1-1, . . . , 103-M-N. In one embodiment, fiber optic link 105 includes two fiber optic cables: a first cable to carry upstream digital data from modems 103-1-1, . . . , 103-M-N to head end 102 and a second cable to carry downstream digital data from head end 102 to modems 103-1-1, . . . , 103-M-N. In another embodiment, fiber optic link 105 comprises a single fiber optic cable that uses wavelength division multiplexing or frequency division multiplexing to separate upstream and downstream digital data on fiber optic link 105.

Optical distribution node 106 is also coupled to coaxial cable links or branches 108-1, . . . , 108-M. Modems, represented by modems 103-1-1, . . . , 103-M-N, are selectively coupled to coaxial links 108-1, . . . , 108-M via directional couplers 110.

In one embodiment, the network 100 includes a transport path for digital data (bi-directional) and a transport path for other broadband services. For the other broadband services, network 100 combines signals from one or more sources at combiner 112 of head end 102. In one embodiment, combiner 112 receives analog and digital video signals. In another embodiment, combiner 112 also receives other data appropriate for transmission over network 100. Combiner 112 is coupled to optical transmitter 114. Optical transmitter 114 provides optical signals to optical distribution node 106 over fiber optic link 115. These optical signals are received by optical receiver 116 and coupled to coaxial cable links 108-1, . . . , 108-M through couplers 118-1, . . . , 118-M, respectively.

The bi-directional data path includes cable modem termination system 111 at head end 102. Termination system 111 includes network termination 113. Network termination 113 is coupled to public switched telephone network (PSTN) or backbone network 121 through headend switch or backbone transport adaptor 119. Termination system 111 is also coupled to optical transceiver 123. Optical transceiver 123 is coupled to optical transceiver 142 at optical distribution node 106 over fiber optic link 105.

In one embodiment, data on fiber optic links 105 and 115 is carried as base-band digital data using on-off keying. In another embodiment, data on fiber optic links 105 and 115 is carried using modulated carriers. Further, data on fiber optic links 105 and 115 is transmitted using the 100BaseT Ethernet protocol or any other standard or custom protocol.

Optical distribution node 106 includes data concentrator or switch 140 that is coupled to optical transceiver 142 and to at least one node modem 138-1, . . . , 138-M for each coaxial cable link 108-1, . . . , 108-M, respectively. Due to the similarity between the circuitry for each coaxial cable link 108-1, . . . , 108-M, only the path in optical distribution node 106 for coaxial cable link 108-1 is described here. However, it is understood that the remaining coaxial cable links include similar circuitry in optical distribution node 106. Data concentrator or switch 140 also includes enterprise network drop 141. In one embodiment, drop 141 comprises a 10/100BaseT interface for a local area network. As fiber optical links 105 and 115 allow nodes 106 to penetrate deeper into network 100, drop 141 provides the advantage of allowing direct access to node 106 for an enterprise network.

In one embodiment, modems 103-1-1, . . . , 103-1-N launch upstream, digital data on coaxial cable link 108-1 by on-off-keying of one of a selected number of radio frequency carriers, e.g., $f_1$ in FIG. 1, with digital data in the form of Ethernet packets. In other embodiments other modulation techniques are used, e.g., quadrature phase shift keying (QPSK), quadrature amplitude modulation (QAM), and other appropriate modulation techniques. Each modem 103-1-1, . . . , 103-1-N uses one of the select number of carriers. It is understood that any appropriate number of carriers can be used. In one embodiment, each of the select number of carriers falls in the frequency range below 42 MHZ. In other embodiments, at least a portion of the select number of carriers fall in a frequency range below the lower cutoff frequency for the downstream data path.

The bi-directional path of optical distribution node 106 includes frequency translator 124 that is coupled to coaxial cable link 108-1 through couplers 126 and 128. In one embodiment, coupler 126 comprises a directional coupler. Coupler 128 comprises a diplexer, a conventional 3 dB or other ratio coupler, or a directional coupler. The output of frequency translator 124 is coupled to coupler 128. Node modem 138-1 is also coupled to frequency translator 124 through coupler 126.

Frequency translator 124 provides a loopback mechanism to implement a collision detection protocol for the bi-directional path of network 100 on coaxial cable link 108-1. Frequency translator 124 translates modulated carriers, e.g., $f_1$, to other frequencies, e.g., $f_2$. Essentially, frequency translator 124 provides aggregate data received from all modems 103-1-1, . . . , 103-1-N on coaxial cable link 108-1 and node modem 138-1 back to modems 103-1-1, . . . , 103-1-N. Each modem 103-1-1, . . . , 103-1-N compares its transmitted data with the aggregate data to determine whether its data was received at optical distribution node 106 without collision with other data or without corruption from ingress noise.

When a modem detects a collision, the modem provides a collision detection signal on another carrier. Modems 103-1-1, . . . , 103-M-N and node modem 138-1 further wait a randomly selected period of time to attempt retransmission of any corrupted data. Advantageously, this process allows network 100 to transmit upstream signals in the band below the downstream band despite ingress and other interference since interference looks like a collision to network 100 and data affected by the interference is automatically retransmitted. This also provides for bi-directional transport of data with symmetrical data rates between upstream and downstream data paths since the same frequency is used by modem 138-1 and modems 103-1-1, . . . , 103-M-N. The downstream signals from modem 138-1 are frequency translated by translator 124 such that the downstream transmissions are transported on, e.g., frequency $f_2$.

In one embodiment, modems 103-1-1, . . . , 103-M-N transmit Ethernet packets over network 100. It is understood that in other embodiments, the data transmitted over network 100 may comprise other formats.

In operation, digital data is transmitted between modems 103-1-1, ..., 103-M-N and head end 102 over network 100. For example, digital data originating at modem 103-1-1 is provided to coaxial cable 108-1 on a modulated carrier. Frequency translator 124 translates the frequency of the modulated carrier and retransmits the data back to modem 103-1-1 with aggregate data from all modems on coaxial link 108-1 and downstream data from node modem 138-1. Modem 103-1-1 checks for collisions and if any, transmits a collision detect signal on a separate carrier and then waits a random amount of time and retransmits the data.

In the absence of a collision, the data is passed to data concentrator 140 and concentrated with data from other coaxial links. This data is passed to head end 102 over optical fiber link 105 by transmitter 142. At head end 102, the data is routed or switched to network 121.

Downstream data is transmitted from head end 102 over fiber optic link 115 to optical distribution node 106. At node 106, the downstream digital data is demodulated by node modem 138-1 and provided to frequency translator 124. The translated data is provided to modems 103-1-1, ..., 103-1-N over coaxial cable link 108-1 with the aggregate upstream data from modems 103-1-1, ..., 103-1-N. Modems 103-1-1, ..., 103-1-N listen to frequency $f_2$ to receive downstream data from node modem 138-1. In this embodiment, modem 138-1 and modems 103-1-1, ..., 103-M-N are substantially the same thus the available bandwidth in upstream and downstream directions is the same.

It is noted that in embodiments with more than one carrier frequency used for upstream communication on coaxial cable links, then additional node modems are coupled between frequency translator 124 and concentrator 140 for each coaxial cable link.

Figure 3:
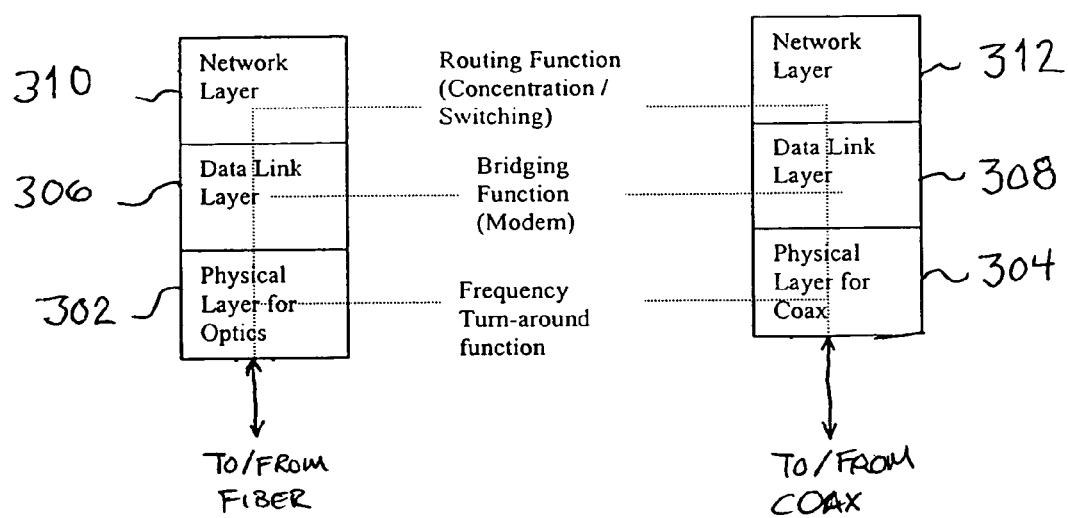
FIG. 3 is a dataflow diagram that illustrates an embodiment of a layered implementation of communication protocol stacks for an optical distribution node according to the teachings of the present invention.

Node 106 of FIG. 1 advantageously combines CSMA/CD error detection through frequency translation ("frequency turn-around") with modem functionality and data concentration. This combination of functionality is shown in FIG. 3. Frequency turn-around is performed at the physical layer as indicated next to blocks 302 and 304. Bridging or modem functionality is provided at the data link layer as indicated at blocks 306 and 308. Further, routing functionality, e.g., concentration and switching, is provided at the network layer as indicated by blocks 310 and 312. In this manner, the frequency turn-around scheme does not require modulation or demodulation processes and is kept transparent to the hardware at node 106.

II. ANOTHER EMBODIMENT OF AN OPTICAL DISTRIBUTION NODE

Figure 2:
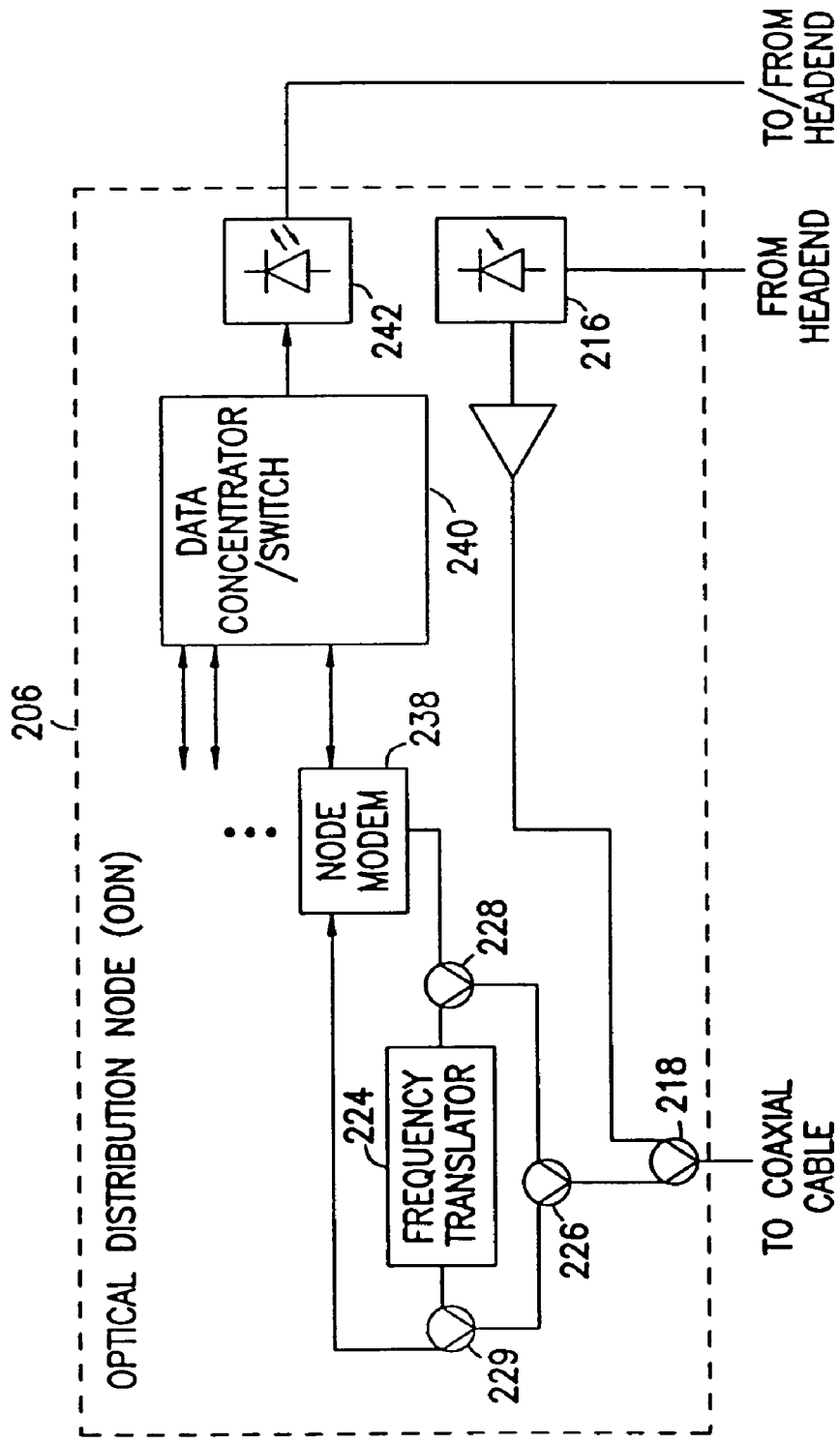
FIG. 2 is a block diagram of another embodiment of an optical distribution node for a hybrid fiber/coax network according to the teachings of the present invention.

FIG. 2 is a block diagram of another embodiment of an optical distribution node, indicated generally at 206 and constructed according to the teachings of the present invention. In this embodiment, optical distribution node 206 advantageously provides for asymmetrical transport of data between a head end and modems. Node 206 includes transceiver 242 that coupled to the head end over a fiber optic link. Transceiver 242 is coupled to data concentrator or switch 240. Data concentrator 240 is coupled to a plurality of node modems represented by node modem 238.

Node modem 238 provides upstream and downstream communication for digital data in node 106. In the downstream path, node modem 238 is coupled to a coaxial cable link through couplers 226 and 228, and diplexer 218. In the upstream direction, data is received from the coaxial cable link by node modem 238 via couplers 226 and 229, and diplexer 218. Couplers 226, 228 and 229 comprise directional couplers or conventional 3 dB or other ratio couplers. In this manner, the downstream data from node modem 238 is not frequency translated at frequency translator 224 and thus the downstream data is provided to the modems on a different carrier frequency. This allows for different data rates to be used in the downstream and the upstream directions.

Frequency translator 224 is coupled between couplers 229 and 228. Frequency translator 224 provides the same collision detection mechanism as described above with respect to frequency translator 124 of FIG. 1 with the exception that downstream data is not included in the data that is provided back to the modems on the coaxial cable link.

In operation, digital data is provided on a bi-directional path through node 206 in a manner that allows different data rates to be used in the upstream and downstream directions. The downstream data is received at transceiver 242 and provided to node modem 238 through concentrator 240. This data is modulated on a downstream carrier and transmitted to modems through couplers 228, 226, and 218.

In the upstream direction, data is received from modems and frequency translated by frequency translator 224. This provides a collision detection mechanism for the upstream digital data path. If a collision is detected, then a collision detection signal is sent on another carrier and the modems wait a random amount of time and then attempt to retransmit.

If there is no collision, then node modem 238 receives the upstream data and provides it to the head end through data concentrator 240.

Node 206 of FIG. 2 advantageously also combines CSMA/CD error detection through frequency translation ("frequency turn-around") with modem functionality and data concentration. This combination of functionality is shown and described above with respect to FIG. 3.

CONCLUSION

A hybrid fiber/coax network has been described with a digital return path. Essentially, data is modulated on carriers by modems and provided to an optical distribution node. A collision detection process is used by looping back aggregate data to the modems on a common coaxial cable link. The data from a number of coaxial cable links are concentrated and transmitted as digital data over a fiber optic connection to a head end or hub.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. For example, data can be transmitted in formats other than standard Ethernet formats. Further, any appropriate number of carrier frequencies can be used to carry digital data to the optical distribution nodes. Also, a part of the data can be transmitted on carriers that are located within or above the conventional downstream spectrum. For example, a portion of the data can be transmitted on unused carriers that are typically used for downstream channels. Further, carriers above the typical upper limit, e.g., above 750 MHZ or 850 MHZ, can also be used for upstream transmission. This allows the data path to carry more data than the conventional 5–42 MHZ band. Further, it is understood that a portion of the data path can be carried on frequencies between 42 and 850 MHZ if the spectrum is not allocated for downstream communication. In one embodiment, frequency turn-around at nodes 106 and 206 is accomplished according to ANSI/IEEE standard 802.3 (1996) (the "10BROAD36 standard"). In some embodiments, node modems are omitted from the optical distribution node. Further, it is understood that a frequency translator and node modem can be coupled to one or more coaxial cable links.

What is claimed is:

1. A hybrid fiber/coax network, comprising:
   a head end;
   at least one optical distribution node coupled to the head end over at least one fiber optic link;
   at least one coaxial cable link, coupled to the at least one optical distribution node, that receives upstream digital data from and that provides downstream digital data to a plurality of modems;
   wherein the at least one coaxial cable link is shared by at least two of the plurality of modems for data communication;
   wherein the upstream digital data is transmitted over the at least one coaxial cable link on at least one modulated carrier; and
   wherein the optical distribution node has a bi-directional data path that includes:
      a laser transceiver coupled to the at least one fiber optic link that communicates upstream and downstream digital data with the head end over the at least one fiber optic link;
      a data concentrator coupled to the laser transceiver; and
      a node modem coupled between the at least one coaxial cable link and the data concentrator that demodulates upstream digital data for the data concentrator and that modulates downstream digital data for transmission over the coaxial cable link.

2. The network of claim 1, wherein the bi-directional data path carries the upstream and the downstream digital data at substantially the same data rate.

3. The network of claim 1, wherein the bi-directional data path carries the upstream and the downstream digital data with different data rates.

4. The network of claim 1, wherein the node modem transmits downstream digital data on a modulated carrier with a different frequency from the upstream digital data.

5. The network of claim 1, and further including a frequency translator, coupled to the at least one coaxial cable link, that receives and translates the upstream digital data from the modems to a different carrier to provide a signal to the modems for collision detection.

6. The network of claim 5, wherein the node modem is coupled to the at least one coaxial cable link through the frequency translator such that the downstream digital data is frequency translated to the different carrier.

7. The network of claim 5, wherein the modems transmit collision detection signals on a different modulated carrier when a collision is detected based on the signal from the frequency translator.

8. The network of claim 5, wherein the frequency translator is adapted to receive signals over the at least one coaxial cable link that are modulated with one of quadrature amplitude modulation (QAM), quadrature phase shifted keying (QPSK), and on-off keying.

9. The network of claim 1, wherein the at least one fiber optic link comprises a first fiber optic link that carries upstream and downstream digital data and a second fiber optic link that carries downstream, broadband transmission.

10. The network of claim 9, wherein the first fiber optic link comprises separate fiber optic cables for upstream and downstream digital data.

11. The network of claim 9, wherein the first fiber optic link comprises a single fiber optic cable with separate wavelengths for upstream and downstream digital data.

12. The network of claim 1, wherein the upstream, digital data is carried on one of at least two modulated carriers.

13. The network of claim 1, wherein the upstream, digital data comprises Ethernet packets.

14. The network of claim 1, wherein at least another portion of the upstream, digital data is transmitted over the plurality of coaxial cable links on modulated carrier above the frequency band for downstream transmissions.

15. The network of claim 1, wherein the laser transmitter transmits the upstream, digital data as one of base-band and modulated carrier transmission.

16. The network of claim 1, wherein the data concentrator includes a network drop.

17. A hybrid fiber/coax network, comprising:
   a head end;
   a plurality of optical distribution nodes coupled to the head end over at least one fiber optic link;
   a plurality of coaxial cable links selectively coupled to the plurality of optical distribution nodes;
   wherein each of the optical distribution nodes includes a data concentrator coupled to a plurality of node modems to provide communication of upstream and downstream digital data between the head end and a plurality of modems coupled to coaxial cable links of the optical distribution node;
   wherein at least one of the plurality of coaxial cable links is shared by at least two of the plurality of modems; and
   wherein each optical distribution node includes a frequency translator coupled to each coaxial cable link to provide a frequency turn-around function at the physical layer to detect collisions on the at least one coaxial cable link.

18. The network of claim 17, wherein the bi-directional data path carries the upstream and the downstream digital data at substantially the same data rate.

19. The network of claim 17, wherein the bi-directional data path carries the upstream and the downstream digital data with different data rates.

20. The network of claim 19, wherein the first fiber optic link comprises separate fiber optic cables for upstream and downstream digital data.

21. The network of claim 19, wherein the first fiber optic link comprises a single fiber optic cable with separate wavelengths for upstream and downstream digital data.

22. The network of claim 17, wherein the node modem transmits downstream digital data on a modulated carrier with a different frequency from the upstream digital data.

23. The network of claim 17, wherein the at least one fiber optic link comprises a first fiber optic link that carries upstream and downstream digital data and a second fiber optic link that carries downstream, broadband transmissions.

24. The network of claim 17, wherein the upstream, digital data is carried on one of at least two modulated carriers.

25. The network of claim 17, wherein the modems transmit collision detection signals on a different modulated carrier when a collision is detected based on the signal from the frequency translator.

26. The network of claim 17, wherein the upstream digital data comprises Ethernet packets.

27. The network of claim 17, wherein the laser transmitter transmits the upstream digital data with one of base-band and modulated carrier.

28. The network of claim 17, wherein the frequency translator is adapted to receive signals over the at least one coaxial cable link that are modulated with one of quadrature amplitude modulation (QAM), quadrature phase shifted keying (QPSK), and on-off keying.

29. The network of claim 17, wherein the data concentrator includes a network drop.

30. An optical distribution node for a hybrid fiber/coax network, the optical distribution node comprising:
   a laser transceiver coupleable to at least one fiber optic link that communicates upstream and downstream digital data with a head end of the hybrid fiber/coax network over the at least one fiber optic link;
   a data concentrator coupled to the laser;
   at least one port coupleable to a coaxial cable link of the hybrid fiber/coax network to provide communication to and from a plurality of modems; and
   at least one node modem selectively coupled between the at least one port and the data concentrator that demodulates upstream digital data for the data concentrator and that modulates downstream digital data for transmission over the coaxial cable link.

31. The node of claim 30, and further comprising a frequency translator, coupled to the at least one port, that receives and translates the upstream digital data from a plurality of modems to a different carrier to provide a signal to the modems for collision detection.

32. The node of claim 31, wherein the frequency translator also receives upstream, digital data on at least one additional carrier.

33. The node of claim 30, wherein the upstream, digital data comprises Ethernet packets.

34. The node of claim 30, wherein the laser transmitter transmits the upstream, digital data with one of baseband and modulated carriers.

35. The node of claim 30, wherein the upstream and the downstream digital data are transmitted at substantially the same data rate.

36. The node of claim 30, wherein the upstream and the downstream digital data are transmitted with different data rates.

37. The node of claim 30, wherein the downstream digital data is transmitted on a modulated carrier with a different frequency from the upstream digital data.

38. A method for processing data in a bi-directional data path of a hybrid fiber/coax network, the method comprising:
   receiving downstream, digital data at an optical distribution node on at least one optical link;
   selectively transmitting the downstream, digital data on at least one shared coaxial cable link to a plurality of modems on a first carrier;
   receiving, on the at least one coaxial cable link at the optical distribution node, upstream, digital data modulated on a second carrier;
   translating the frequency of the second carrier to a third carrier;
   retransmitting the upstream, digital data modulated on the third carrier on the at least one coaxial cable link;
   checking at the optical distribution node for collision detection signals from the plurality of modems based on the retransmitted upstream, digital data; and
   concentrating and transmitting the upstream, digital data to the head end over the at least one optical link.

39. The method of claim 38, wherein the frequency of the first carrier is the same as the frequency of the second carrier.

40. The method of claim 38, wherein the frequency of the first carrier is different from the frequency of the second carrier.

41. The method of claim 38, wherein checking for collision detection signals comprises monitoring a fourth carrier for collision detection signals.

42. The method of claim 38, wherein transmitting the concentrated, upstream, digital data comprises transmitting one of base-band and modulated carrier signals.

43. The method of claim 38, wherein receiving upstream, digital data comprises receiving Ethernet packets on a modulated carrier.

44. A hybrid fiber/coax network, comprising:
   a head end;
   at least one optical distribution node coupled to the head end over at least one fiber-optic link;
   at least one coaxial cable link, coupled to the at least one optical distribution node, that receives upstream digital data from and that provides downstream digital data to a plurality of modems;
   wherein the at least one coaxial cable link is shared by at least two of the plurality of modems for data communication;
   wherein at least a portion of the upstream digital data is transmitted over the at least one coaxial cable link on at least one modulated carrier below 42 MHz;
   wherein the at least one optical distribution node includes at least one node modem coupled to a data concentrator to communicate upstream and downstream digital data between the head end and the plurality of modems; and
   wherein the optical distribution node also includes a frequency translator that translates the upstream digital data from the plurality of modems to different carrier and retransmits the signal to the modems for collision detection.

45. An optical distribution node, comprising:
   at least one frequency translator coupleable to a coaxial cable link to provide frequency turn-around functionality for collision detection on the coaxial cable link, the coaxial cable link being shared by a plurality of modems;
   at least one node modem coupleable to the coaxial cable link;
   a data concentrator coupled to the at least one node modem; and
   a laser transceiver coupled to the data concentrator and coupleable to a fiber-optic link to communicate digital data to and from a head end.

46. An optical distribution node for a hybrid fiber/coax network, the optical distribution node comprising:
   a laser transceiver coupleable to a fiber optic link that communicates upstream and downstream digital data with a head end of the hybrid fiber/coax network over at least one fiber optic link, wherein the laser transmitter transmits the upstream, digital data with one of baseband and modulated carriers;
   a data concentrator coupled to the laser, wherein the data concentrator includes a network drop;
   at least one port coupleable to a coaxial cable link of the hybrid fiber/coax network;
   wherein the coaxial cable link is shared by a plurality of modems for sending and receiving data communication;

at least one node modem selectively coupled between the at least one port and the data concentrator that demodulates upstream digital data for the data concentrator and that modulates downstream digital data for transmission over the coaxial cable link;

a frequency translator, coupled to the at least one port, that receives and translates the upstream digital data from a plurality of modems to a different carrier to provide a signal to the modems for collision detection;

wherein the frequency translator also receives upstream, digital data on at least one additional carrier, and wherein the frequency translator receives collision detection signals from the plurality of modems on a different modulated carrier when a collision is detected based on the signal from the frequency translator.

* * * * *

UNITED STATES PATENT AND TRADEMARK OFFICE
CERTIFICATE OF CORRECTION

| | | |
|---|---|---|
| PATENT NO. | : 7,031,335 B1 | Page 1 of 1 |
| APPLICATION NO. | : 09/432558 | |
| DATED | : April 18, 2006 | |
| INVENTOR(S) | : Donohue et al. | |

It is certified that error appears in the above-identified patent and that said Letters Patent is hereby corrected as shown below:

Title Pg, Item (56), under "References Cited", include the following citations:

--4,701,909    10-1987    Kavehrad et al.--
--4,101,834    07-1978    Stutt et al.--

At Claim 46, Column 10, Line 66, replace "moderns" with --modems--

Signed and Sealed this

Twenty-fifth Day of November, 2008

JON W. DUDAS
*Director of the United States Patent and Trademark Office*